(12) United States Patent
Puran et al.

(10) Patent No.: US 11,639,691 B2
(45) Date of Patent: May 2, 2023

(54) DEVICE FOR SUPPLYING A GASEOUS FUEL TO AN ENGINE

(71) Applicant: Liebherr Machines Bulle SA, Bulle (CH)

(72) Inventors: Bakir Puran, Vuisternens-en-Ogoz (CH); Bouzid Seba, Broc (CH); Ulrich Weiss, Villars-sur-Glane (CH)

(73) Assignee: Liebherr Machines Bulle SA, Bulle (CH)

( * ) Notice: Subject to any disclaimer, the term of this patent is extended or adjusted under 35 U.S.C. 154(b) by 0 days.

(21) Appl. No.: 17/211,647

(22) Filed: Mar. 24, 2021

(65) Prior Publication Data

US 2021/0301775 A1    Sep. 30, 2021

(30) Foreign Application Priority Data

Mar. 24, 2020   (CH) .................................. 00354/20

(51) Int. Cl.
| | | |
|---|---|---|
| *F02D 19/02* | (2006.01) | |
| *F02M 21/02* | (2006.01) | |
| *F02M 63/02* | (2006.01) | |

(52) U.S. Cl.
CPC ......... *F02D 19/022* (2013.01); *F02M 21/023* (2013.01); *F02M 21/0206* (2013.01); (Continued)

(58) Field of Classification Search
CPC ............... F02D 19/022; F02D 19/0663; F02D 19/0681; F02D 19/0647; F02M 21/0206; F02M 21/0218; F02M 21/0245; F02M 21/023; F02M 21/0242; F02M 21/0212; F02B 63/06
See application file for complete search history.

(56) References Cited

U.S. PATENT DOCUMENTS 5,329,908 A * 7/1994 Tarr .................... F02B 23/0696
                                                     123/472
5,367,999 A * 11/1994 King ...................... F02B 43/00
                                                     123/527

(Continued)

FOREIGN PATENT DOCUMENTS

DE   102008029493 A1   12/2009
DE   102016220851 A1    4/2018
(Continued)

*Primary Examiner* — Sizo B Vilakazi
*Assistant Examiner* — Brian R Kirby
(74) *Attorney, Agent, or Firm* — McCoy Russell LLP

(57) ABSTRACT

The invention relates to a device for supplying a gaseous fuel to an engine that comprises a gas accumulator for receiving highly pressurized gaseous fuel, a gas buffer for receiving medium pressurized gaseous fuel, a gas supply device for delivering a gaseous fuel into an engine combustion space, a first gas line that connects the gas accumulator to the gas buffer and whose gas flow can be regulated via a first valve, a second gas line that connects the gas accumulator to the gas buffer and whose gas flow can be regulated via a second valve, and a third gas line that connects the gas buffer to the gas supply device. The device is further characterized in that a compressor is arranged in the second gas line to increase a pressure of a gaseous fuel flowing from the gas accumulator to the gas buffer.

19 Claims, 4 Drawing Sheets

(52) U.S. Cl.
CPC .... *F02M 21/0218* (2013.01); *F02M 21/0242* (2013.01); *F02M 21/0245* (2013.01); *F02M 63/0225* (2013.01)

(56) References Cited

U.S. PATENT DOCUMENTS

| | | | | |
|---|---|---|---|---|
| 5,499,615 | A * | 3/1996 | Lawrence | F02B 43/00 123/526 |
| 5,713,340 | A * | 2/1998 | Vandenberghe | F02D 19/027 123/682 |
| 5,771,857 | A * | 6/1998 | Willi | F02D 19/024 123/305 |
| 5,832,906 | A * | 11/1998 | Douville | F17C 5/06 123/527 |
| 5,868,122 | A * | 2/1999 | Gram | F02D 19/022 123/527 |
| 5,941,210 | A * | 8/1999 | Hill | F02M 21/0212 123/480 |
| 6,663,350 | B2 * | 12/2003 | Tyree, Jr. | F04B 5/00 417/297.5 |
| 6,698,211 | B2 * | 3/2004 | Gustafson | F02M 21/0221 62/53.2 |
| 6,742,554 | B1 * | 6/2004 | Immel | F17C 1/00 220/560.07 |
| 7,367,312 | B1 * | 5/2008 | Boyer | F02D 19/022 123/304 |
| 7,377,267 | B2 * | 5/2008 | Boyer | F02D 19/024 123/316 |
| 7,463,967 | B2 * | 12/2008 | Ancimer | F02D 19/022 123/480 |
| 7,913,496 | B2 * | 3/2011 | Batenburg | F02M 21/0212 702/182 |
| 8,095,294 | B1 * | 1/2012 | Griffiths | F02D 19/0694 73/114.49 |
| 8,459,241 | B2 * | 6/2013 | Dixon | F02M 21/06 123/527 |
| 8,983,755 | B2 * | 3/2015 | Imamura | F02D 41/0027 123/304 |
| 9,233,679 | B2 * | 1/2016 | Leone | B60W 10/02 |
| 9,234,472 | B2 * | 1/2016 | Kim | F02D 41/0025 |
| 9,234,485 | B2 * | 1/2016 | Ninomiya | G05D 16/2013 |
| 9,989,017 | B2 * | 6/2018 | Foege | F02M 21/06 |
| 10,054,085 | B2 * | 8/2018 | Foege | F02M 31/10 |
| 10,167,786 | B2 * | 1/2019 | McTaggart-Cowan | F02D 19/022 |
| 2006/0213488 | A1 * | 9/2006 | Post | F02M 21/0239 123/527 |
| 2008/0103676 | A1 * | 5/2008 | Ancimer | F02D 19/022 701/103 |
| 2008/0245349 | A1 * | 10/2008 | Mitani | F02M 21/0206 123/575 |
| 2008/0276627 | A1 * | 11/2008 | Lee | F02M 21/0215 123/495 |
| 2009/0150050 | A1 * | 6/2009 | Mashida | F02D 19/061 251/12 |
| 2009/0229572 | A1 * | 9/2009 | Lucas | F02M 43/00 123/456 |
| 2011/0314839 | A1 * | 12/2011 | Brook | F02D 19/022 62/50.2 |
| 2013/0255636 | A1 * | 10/2013 | Pursifull | F02D 19/0628 123/446 |
| 2013/0255646 | A1 * | 10/2013 | Ulrey | F02D 13/0234 123/527 |
| 2013/0306029 | A1 * | 11/2013 | Stockner | F02M 21/0245 123/445 |
| 2014/0033946 | A1 * | 2/2014 | Billig | B61C 17/02 105/62.1 |
| 2014/0238340 | A1 * | 8/2014 | Dunn | F02D 19/0642 123/299 |
| 2014/0238351 | A1 * | 8/2014 | Haas | F02M 37/0052 123/446 |
| 2014/0261304 | A1 * | 9/2014 | McAlister | F02D 19/02 123/299 |
| 2014/0299101 | A1 * | 10/2014 | Melanson | B60K 15/07 123/445 |
| 2015/0040856 | A1 * | 2/2015 | Oka | B63H 21/14 123/27 R |
| 2015/0354514 | A1 * | 12/2015 | Perry | F02M 43/04 123/495 |
| 2017/0183072 | A1 * | 6/2017 | D'Urso | F17C 13/06 |
| 2017/0241350 | A1 * | 8/2017 | Ebbehoj | F02D 19/022 |
| 2019/0264623 | A1 * | 8/2019 | Högnabba | F02M 21/023 |
| 2020/0025163 | A1 * | 1/2020 | Lee | F02M 59/46 |

FOREIGN PATENT DOCUMENTS

| | | | |
|---|---|---|---|
| JP | 2003148688 A | 5/2003 | |
| JP | 2017166424 A | 9/2017 | |
| WO | WO-2010006356 A1 * | 1/2010 | ........... F02D 19/024 |
| WO | 2016115603 A1 | 7/2016 | |

* cited by examiner

DEVICE FOR SUPPLYING A GASEOUS FUEL TO AN ENGINE

CROSS REFERENCE TO RELATED APPLICATION

The present application claims priority to Swiss Patent Application No. 00354/20 filed on Mar. 24, 2020. The entire contents of the above-listed application is hereby incorporated by reference for all purposes.

TECHNICAL FIELD

The present invention relates to a device for supplying a gaseous fuel to an engine.

BACKGROUND AND SUMMARY

The use of gaseous fuels can even become reality for long distance trucks and/or for mobile work machines due to legislative changes in the taxation of fuel and/or due to exhaust emission legislation. Among gaseous fuels, hydrogen, for example, provides the option of an almost climate neutral "well to tank provision". Hydrogen can furthermore also be used in mobile fuel cell drives and thus in actually emission free (zero emission) vehicles. Hydrogen internal combustion engines offer tee potential of being able to observe even strict exhaust gas limits solely by internal engine measures so that at least the exhaust aftertreatment system can be substantially reduced.

Compressed gaseous hydrogen admittedly also has a volumetrically smaller energy density than other known kinds of storage such as liquid hydrogen, cryogenic hydrogen or, for example, in the form of methane as a chemically bound hydrogen at a pressure level of, for example, 700 bar, but has the advantage that the handling is comparatively simple when taking into account the refueling and the onboard conditioning together. Hydrogen adsorption stores have an extremely high weight of their own.

Refueling, onboard storage, and conditioning for the fuel supply of an internal combustion engine have in the meantime become relatively largely mature for compressed gaseous hydrogen. 350 bar and 700 bar have become established as certain standard values for pressure tanks and pressure tank systems.

It has in the meantime become apparent in the trend of developments that a high pressure fuel gas injection is also increasingly widespread in gas engines. An increase in the fuel gas injection pressure correspondingly additionally permits a shift of the ignition angle in the direction of the top dead center piston position, which effects a raising of the knock limit. The latter permits an increase of the compression ratio, with the compression ratio here being able to be increased up to the full exploitation of the raised knock limit due to the increased fuel gas injection pressure.

This overall provides an additional corridor in which an efficiency increase and/or a higher engine performance can be provided. An optimization between the potential gain in engine performance and the potential efficiency increase can be carried out within this corridor as part of engine management. In one extreme case, the total gain is used for the raising of the full load characteristic. In the other extreme case, the total gain is used for an efficiency increase while maintaining the full load characteristic. The described relationships apply generally to gas engines and in particular to hydrogen engines.

Starting from the operating situation of a completely filled gas accumulator, the requirement for high injection pressures initially even represents a positive relationship because a high proportion of the compression energy used for the store filling is used for the operation of the internal combustion engine. As the depletion of the gas accumulator increases, the situation is obviously and necessarily adopted that the pressure of the fuel gas then present is no longer sufficiently high to cover the target pressure of the fuel gas injection from a specific charge state onward.

Provided that the operation of the gas engine is provided for particularly high injection pressures of some hundred bar, this specific charge state is adopted even though the chemical energy and compression energy of the remaining fuel gas amount is very high in principle in the gas accumulator.

The target rail pressure could be in an order of magnitude of 300 bar and the gas accumulator could be configured for 700 bar for a hydrogen engine. It already becomes clear from this that the energy content directly usable from the gas accumulator only corresponds to approximately half of the energy content present since on a dropping of the pressure in the gas accumulator below 300 bar, the then remaining gaseous fuel respectively the then remaining fuel gas can no longer be supplied to the combustion space or to the rail at the desired pressure.

In the gas engines commercially used to date, the fuel gas supply does not yet take place via a direct injection, but is rather, for example, operated by means of intake manifold fuel injection or via a fuel gas/air mix formation upstream of the compression.

The fuel gas pressure level required at the gas engine only amounts to a few bar for the last-named application purposes.

The advantage of the invention comes into effect the better, the smaller the pressure difference of the fully filled pressure gas store and the pressure required for the application purpose is. In view of the pressure tanks of, for example, 350 bar or 700 bar, already available for some time, it is a new demand in the technological sector of gas internal combustion engines since it effects a better exploitation of the fuel gas taken along.

It is accordingly the aim of the present invention to provide a device for the supply of a fuel gas respectively of a gaseous fuel to a gas engine that overcomes the above-named disadvantages and in particular enables an increase of the usable energy content of the gas accumulator starting from its full refueling. This is done using a device that has all the features of claim 1. Further advantageous embodiments are listed in the dependent claims here.

Provision is made in accordance with the invention that the device for supplying a fuel gas to a gas engine comprises a gas accumulator for receiving highly pressurized gaseous fuel, a gas buffer for receiving medium pressurized gaseous fuel, a gas supply device for delivering a gaseous fuel into an engine combustion space, a first gas line that connects the gas accumulator to the gas buffer and whose gas flow can be regulated via a first valve, a second gas line that connects the gas accumulator to the gas buffer and whose gas flow can be regulated via a second valve, and a third gas line that connects the gas buffer to the gas supply device. The device is further characterized in that, a compressor is arranged in the second gas line to increase a pressure of a fuel gas flowing from the gas accumulator to the gas buffer.

It is accordingly possible in accordance with the invention to first connect the gas accumulator directly to the gas buffer (via the first gas line). With a "full" gas accumulator, the fuel gas stored therein is then at high pressure. If this fuel gas is allowed to successively flow off into the gas buffer, from where it is guided via the gas supply device into a combustion space of a gas engine, the pressure in the gas buffer gradually decreases. A falling below of a specific pressure value of the fuel gas stored in the gas accumulator then occurs as a consequence of the continuous flowing off of fuel gas from said gas accumulator so that the preferred target pressure value can no longer be supplied to its consumer, for example a gas engine, by a further direct supply of fuel gas from the gas accumulator into the gas buffer.

In this state, the fluid connection over the first gas line is interrupted by a closing of the first valve. The fuel gas present in the gas accumulator can then be conducted by opening the valve via the second gas line to a compressor that compresses the fuel gas coming from the gas accumulator so that the desired target pressure value of the gas in the gas buffer can be reached.

It is advantageous here that the gas accumulator can be emptied considerably better than would the case without the second gas line provided with the compressor. The gas accumulator can finally now also be emptied below the target pressure value of the fuel gas for a supply into an engine combustion space, which increases the possible time duration respectively the possible energy delivery of an interrupted use of the gas engine. The refueling of the gas accumulator is accordingly no longer required so often since a higher proportion of the gas amount present in the gas accumulator is usable.

Provision can be made in accordance with an optional further development of the invention that a control unit is furthermore present that is configured for this purpose and that controls the first valve such that a fuel gas flowing from the gas accumulator into the gas buffer has a medium pressure and, if the fuel gas remaining in the gas accumulator falls below the medium pressure, to close the first valve and to open the second valve to bring the fuel gas present below the medium pressure in the gas accumulator to the medium pressure portion-wise with the aid of the compressor and to supply it to the gas buffer.

It is possible in accordance with the invention to directly conduct the highly pressurized fuel gas in the gas accumulator into the gas buffer as long as the desired medium pressure (target pressure) in the gas buffer can still be reached by conducting the gas from the gas accumulator. This can no longer be effected if the gas pressure in the gas accumulator falls below the middle pressure, that is the target pressure of the gas buffer. The first gas line is then closed and the second gas line, via which the gas pressure can be increased by the compressor, is opened. Fuel gas that has a lower pressure value than the target pressure of the gas buffer can thus also be removed for use from the gas accumulator.

Provision can furthermore be made in accordance with the invention that a check valve, preferably a preloaded check valve, more preferably a check valve having a variable preload, is arranged between a pressure side of the compressor and the gas buffer.

The arrangement of a check valve prevents the outflow of fuel gas from the gas buffer. If the check valve is preloaded, it is ensured that only gas that exceeds a specific pressure in dependence on the preload of the check valve is introduced into the gas buffer. If the preload is variable, the pressure value of fuel gas entering into the gas buffer can accordingly be varied, which can in particular be of advantage for the dimensioning of the compressor.

It is thus conceivable that a compressor can only implement a pressure difference of 150 bar. If the pressure value in the gas accumulator drops so much that the target pressure value in the gas buffer can also no longer be achieved by an addition of 150 bar, the device can also still deliver satisfactory results by carrying out other measures. The preload with a reduced target pressure value of the check valve can then be reduced for such a mode of operation so that a reduced target pressure value can be adopted in the gas buffer. It can accordingly be of advantage if the preload of the check valve is configured as variable.

Provision can be made in accordance with an optional further development of the invention that the gas supply device is configured to supply the fuel gas having the medium pressure to an engine combustion space as a gaseous fuel.

The gas supply device can here introduce the fuel gas coming from the gas buffer directly into an engine combustion space of a gas engine. The gas supply device can here introduce the fuel gas that is at medium pressure into an engine combustion space in a true to cycle manner. A plurality of engine combustion spaces that work in a manner offset in time to one another and that each have at least one gas supply of their own can naturally also be provided.

Provision can preferably be made in accordance with the invention that the high pressure corresponds to a pressure range of 550 to 850 bar, preferably of 600 to 800 bar, more preferably of 650 to 750 bar, and that the medium pressure corresponds to a pressure range of 150 to 500 bar, preferably of 250 to 400 bar, and more preferably of 200 to 350 bar.

It is therefore accordingly possible that the fuel gas is stored at a higher pressure in the gas accumulator than in the gas buffer. If the gas accumulator is completely filled, the fuel gas therein can have a pressure level of 550-850 bar. A typical pressure value here is 700 bar. The fuel gas is received in the gas buffer at a pressure level of 150 to 500 bar, with a typical value for this being 320 bar. The fuel gas is preferably injected from the gas buffer via the gas supply device into the engine combustion space via a pressure regulator.

Provision can be made in accordance with a further advantageous modification of the invention that the gas accumulator has a larger storage volume, preferably a storage volume that is at least 10 times larger, more preferably a storage volume that is at least 25 times larger, than the gas buffer.

The gas accumulator can thus, for example, have a volume of 1500-2000 liters and the gas buffer can have a volume of 20 to 50 liters.

The gas buffer and/or a gas line section between the compressor and the gas buffer is/are preferably provided with a heat exchanger, with the heat exchanger preferably being connected to the main cooling circuit of the gas engine.

The heat exchanger can be useful when the fuel gas present in the gas accumulator has a pressure below the pressure for the gas buffer. In this case, the fuel gas coming from the gas accumulator is compressed by the compressor and supplied to the gas buffer. However, a heating of the gas occurs in this process so that a combustion process taking place in the engine combustion space runs less efficiently. Since a gas that is too warm results in an expansion and a reduction of the injection amount associated therewith, this is problematic. To prevent this, the fuel gas is cooled by a heat exchanger downstream of the compressor. The heat exchanger can here cooperate with a main cooling circuit of a gas engine.

Provision can furthermore be made in accordance with the invention that the device is further provided with a control unit that is configured to extend the opening duration of the fuel gas supply into an engine combustion space and/or to shift ignition timing for a fuel gas present in the engine combustion space when the fuel gas remaining in the gas accumulator falls below the medium pressure.

There is thereby the option of further delaying the switchover from the first gas line to the second gas line provided with the compressor and thus to save the energy otherwise required by the compressor. It is additionally of advantage here that the compressor now no longer has to be so powerful since on a falling below of a first pressure threshold value in the gas accumulator, the compressor does not yet have to be used, but this is only the case when the fuel gas remaining in the gas accumulator also falls below a second pressure threshold value that is smaller than the first pressure threshold value. The delivery pressure of the compressor accordingly only to be ensured up to the second pressure threshold value so that the demands on the compressor are less challenging than in the case in which the compressor would have to deliver the delivery pressure of the gas at the first pressure threshold value.

Provision can furthermore be made in accordance with an optional further development of the invention that the device has a control unit that is configured to change at least one operating parameter of the gas engine when the pressure level of the fuel gas remaining in the gas accumulator falls below the medium pressure, in particular by:

using a changed set of engine data that, for example, effects a power increase with the disadvantage of a reduced efficiency with respect to the lower rail pressure;

lowering a charge air temperature by increasing the cooling power;

making a mixture in the engine combustion space more lean by increasing the charge air amount with a simultaneous increase of the charge air cooling power;

carrying out an external exhaust gas recirculation using an exhaust gas recirculation cooling;

switching in of an internal exhaust gas recirculation; and/or carrying out a water injection, e.g. into the charge air and/or into an exhaust gas recirculation path.

The engine control can accordingly be adapted to the now lower pressure of the fuel gas. The inclusion of the compressor arranged in the gas line can accordingly also only be provided on a further dropped pressure of the gas in the gas accumulator.

Provision can furthermore be made in accordance with the invention that the device is provided with a gas engine in which the gas supply takes place via a direct injection, with the gas engine in particular being able to be a hydrogen engine that is configured to combust hydrogen or a hydrogen mixture in an engine combustion space.

Provision can be made in accordance with an optional modification of the present invention that the gas accumulator comprises a plurality of gas storage units connected to one another. One of the plurality of gas storage units can thus, for example, have a volume of 300 liters, with a total of 5 to 7 such gas storage units forming a gas accumulator. The configuring of the gas accumulator by a plurality of storage units makes possible the variable attachment of the storage units that, however, have considerable dimensions.

Provision can further be made that the individual gas injectors comprising the gas supply device obtain the respective pressurized fuel gas to be delivered into the engine combustion space via a common rail, with the rail preferably being arranged in the third gas line. The rail is therefore a common line connected to at least two of the plurality of gas injectors via which rail the gas supply injectors obtain the fuel gas to be delivered into the engine combustion space.

The invention furthermore relates to a mobile work machine, in particular to a crawler crane, having a device in accordance with one of the above-described variants.

Provision can be made there that the mobile work machine is further provided with a recovery device for converting kinetic energy into electrical energy, with the mobile work machine being configured to use the electrical energy to operate the compressor, preferably with the electrical energy converted from kinetic energy alternatively or additionally being buffered in a battery before the supply to the compressor.

Provision can alternatively or additionally be made here that the mobile work machine is further provided with a recovery device for converting kinetic energy into hydraulic energy, with the mobile work machine being configured to use the hydraulic energy to operate the compressor, in particular by supplying the hydraulic energy to a hydraulic motor driving the compressor, preferably with the hydraulic energy converted from kinetic energy being buffered in a hydraulic accumulator.

BRIEF DESCRIPTION OF THE FIGURES

Further advantages, features, and details of the invention will become clear on the basis of the following description of the Figures. There are shown.

DETAILED DESCRIPTION

Figure 1A:
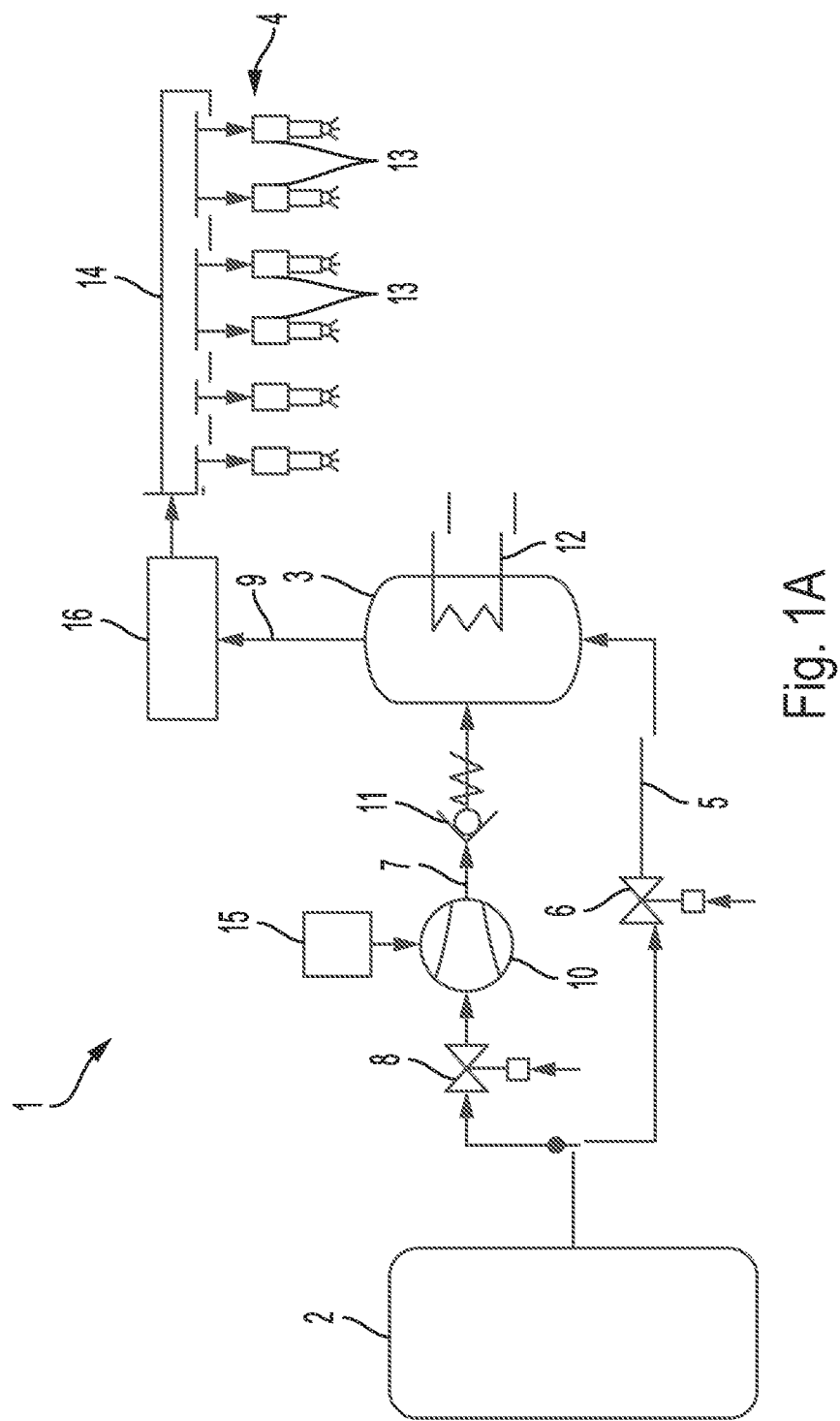
FIG. 1A: an embodiment of the present invention.

FIG. 1A shows a schematic representation of the device 1 in accordance with the invention. A gas accumulator 2 can be recognized that preferably comprises a plurality of individual stores. Provision can also be made here that it has a line system that enables a refueling of all the plurality of individual stores and a gas removal via a respective common connection.

The device 1 has a first gas line 5 and a second gas line 7 to a gas buffer 3. A gas connection between the gas accumulator 2 and a gas buffer 3 is produced via the first gas line 5 with an open valve 6 and a pressure limiter 17.

There is a gas connection between the gas accumulator 2 and the low pressure side of a compressor 10 with an open valve 8. Provided that no gas removal from the gas accumulator 2 is provided, the two valves 6, 8 in the respective gas line 5, 7 are closed.

In FIG. 1A, the gas engine is not shown completely for reasons of clarity, but only the fuel gas path including the gas supply device 4.

If the fuel gas pressure in the gas accumulator 2 is not yet above a first threshold value of, for example, 320 bar with respect to its configuration, the first valve 6 is open and the second valve 8 is closed in operation of the gas engine. The first threshold value corresponds to a pressure value at which the fuel gas can be supplied directly into the combustion space of the gas engine at the preferred target pressure. This first threshold value is smaller than the maximum pressure at which the gas accumulator can be filled.

In a provided first operating mode, the fuel gas suppled to the gas engine is taken from the gas accumulator 2 and is supplied to a combustion space via the open first valve 6, the pressure limiter 17, the gas buffer 3, the controllable or regulable unit 16 for setting the rail pressure, the rail 14, and finally via an open injector 13. The gas buffer 3 in this operating mode only serves the reduction of pressure fluctuations of the fuel gas conducted at the gas engine.

Without the pressure limiter 16, the gas buffer 3 would have to be substantially more pressure resistant. It is nevertheless conceivable that the desired pressure level can be maintained in the rail 14 without a pressure limiter 16 by a pulsed delivery of gas from the gas buffer 3. This is, however, possible better and simpler with the pressure limiter 16.

In a specific embodiment, it can be a 6 cylinder hydrogen engine that has a maximum power in a range from 360 kW to 400 kW. The preferred rail pressure, i.e. a first target value of the rail pressure, can be in the range of 300 bar. The gas accumulator 2 can here be configured for a pressure level of approximately 700 bar. Provision can furthermore be made that the gas buffer 3 is designed for a maximum pressure of 450 bar or less, for example 400 bar or 350 bar.

After a certain operating duration of the gas engine and after the continuous removal of fuel gas from the gas accumulator 2 associated therewith, the pressure in the gas accumulator 2 approaches a first threshold pressure value of, for example, 320 bar. Provided that the fuel gas pressure in the gas accumulator 2 is no longer above this first threshold pressure value, the preferred pressure level of, for example, 300 bar can no longer be provided to the rail 14 over the gas line 5.

A second operating mode can accordingly be provided in accordance with the invention in which the second valve 8 is open in good time before the reaching of this first threshold value and the compressor 10 is operated. The fuel gas supply from the gas accumulator 2 into the gas buffer 3 thus takes place over the second gas line 7, with the pressure level being raised by the compressor 10 so that the preferred pressure level of, for example, 300 bar can continue to be provided to the rail 14 starting from the gas buffer 3.

The design of the device 1 in accordance with the invention enables an interruption-free switching over of these two operating modes of the fuel gas supply, with the fuel gas being obtained directly from the gas accumulator 2 via the first valve 6 in the first operating mode and with the pressure level of the fuel gas coming from the gas accumulator 2 over the second gas line 7 being raised while using a compressor 10 in the second operating mode and a fuel gas store at a sufficiently high pressure thereby being provided in the gas buffer 3 to be able to provide the rail with the preferred target pressure of, for example, 300 bar.

The fuel gas supply in accordance with the invention preferably provides a cooling possibility of the fuel gas compressed by the compressor 10. This can take place via a heat exchanger 12 installed in the gas buffer 3. The secondary side of the heat exchanger 12 could by way of example be connected to the main cooling circuit of the gas engine. Alternatively or additionally, a heat exchanger 12 could be installed at a different point of the fuel gas supply in accordance with the invention, for instance along the path between the compressor 10 and the gas buffer 3.

The fuel gas supply in accordance with the invention enables a fuel gas removal from the gas accumulator 2 while supplying its intended use up to a pressure level that is a great deal smaller than the first threshold value of, for example, 320 bar. In order, on the one hand, to be able to utilize a high proportion of the fuel gas amount present in the gas accumulator 2 up to a refueling and, on the other hand, to keep demands and thus the costs for a suitable compressor 10 within limits, a gas removal is provided up to a dropping of the pressure level to a second threshold pressure value that can, for example, be at approximately 50 bar. A reciprocating compressor has proved to be advantageous for the implementation of a compressor 10.

The requirement that it is ensured up to the reaching of the second threshold pressure value in the gas accumulator 2 that a sufficiently high mass flow of compressed fuel gas can be supplied to the gas buffer 3 to be able to operate the gas engine at the working point of its maximum output power is a further important aspect for the design of the compressor 10 and of its drive 15. It is clear here that this requirement can be alleviated in specific applications, for example in that only that working range of the gas engine is looked at that is actually used in the application or in that a gas buffer 3 is used that has a sufficiently high capacity (e.g. the configuration 350 bar or 400 bar and 25 l), whereby brief load peaks of the gas engine can be dealt with. However, this is only sensible when only brief load peaks occur in the application.

Provision can be made in a preferred embodiment of the invention that the compressor 10 only works at a single working point and accordingly in pulsed operation. The drive of the compressor 10 can in this manner be operated at the best systemic point or at least at a particularly high system efficiency. The compressor is particularly preferably switched on when the fuel gas pressure in the gas buffer 3 drops to a third threshold value of, for example, 330 bar and is switched off when a fourth threshold value of, for example, 350 bar is reached.

Starting from the operating situation of a completely filled gas accumulator 2, the fuel gas can flow over the first gas line 5 to the gas buffer 3 and the gas supply device 4 can be operated at the first target value of the rail pressure of, for example, 300 bar. Provided that the first threshold pressure value in the gas accumulator 2, that should amount to 320 bar by way of example, is fallen below, an operation can take place in which the fuel gas of the gas supply device 4 is still supplied via the gas line 5 while carrying out a third operating mode up to the reaching of a further, fifth threshold pressure value that is disposed below it and that can, for example, amount to 220 bar. However, this requires a lowering of the rail pressure to a second target value of, for example, 200 bar that has to be below the fifth threshold pressure value. The fact that the power output capacity of the gas engine is reduced due to the lowered target rail pressure can be avoided by other measures (see below).

The starting point of the third operating mode is a lowering of the fuel gas pressure in the gas buffer 3 to a fifth threshold pressure value of, for example, 220 bar that is below the first threshold pressure value of, for example, 320 bar.

It is clear that with the stipulation of the fifth threshold pressure value of, for example, 220 bar in the gas buffer 3, the supply can initially take place over the first gas line 5. As soon as the gas pressure in the gas accumulator 2 falls below the fifth threshold pressure value, the gas supply takes place over the second gas line 7 having the compressor 10.

If the gas pressure in the gas accumulator 2 in this third operating mode is below the first target pressure value (of, for example, 320 bar), but above the fifth target pressure value (of, for example, 220 bar), a fuel gas amount that no longer covers performance would be provided to the engine combustion space with an unchanged operating management of the gas engine and/or of the gas supply device 4.

To avoid this, a different parameter set separately provided for this purpose has to be used by the engine management that in particular has an effect on the control or regulation of the fuel gas injection.

So that the same amount of fuel gas is supplied to the combustion space while reducing the rail pressure, the opening duration of the respective injector 13, or more generally of the gas supply device 4, can be extended by a control or regulation unit. The same engine performance can thereby also be achieved at least within certain limits at a reduced fuel gas pressure. An adaptation of the injection start can furthermore also be sensible or necessary. Alternatively or additionally, a shift of the ignition angle can be sensible or necessary. If corresponding interventions are provided, the shifts of the injection start and/or of the ignition angle preferably take place in the direction of the piston bottom dead center of the engine.

So that the gas engine can cover its full power range in an operation in accordance with the invention in accordance with this third operating mode at which the second target value of the rail pressure of, for example, 200 bar is valid that is lower than the first desired value of the rail pressure of, for example, 300 bar, an intervention in the operating management of the gas engine can be provided. Such an intervention can be one of the measures named below or a combination thereof:

using a different set of changed engine data that have been stored separately for this purpose and that effects a power increase, for example, with the disadvantage of a reduced efficiency with respect to the lower rail pressure;

lowering the charge air temperature by increasing the cooling power;

making more lean by increasing the charge air amount with a simultaneous increase of the charge air cooling power;

external exhaust gas recirculation (EGR) with EGR cooling;

internal EGR can be switched in water injection, e.g. into the charge air and/or into the EGR path.

FIG. 1A is a modified embodiment of the present invention. The device 1 shown there has been expanded by a further gas line 17, the fourth gas line 17, that extends to the gas pressure control unit 16 for the setting of the rail pressure starting from the pressure gas store 2 over a further control valve 20 that can optionally be provided, a pressure limiter 18, and a pressure tank 19 that is only required to alleviate pressure fluctuations and can therefore be very small. This modification allows a need-based use of the compressor 10. The control unit may have instructions stored therein (e.g., in non-transitory memory) to receive input from one or more sensors in the system, and send signals to one or more actuators, such as the control valve, or an engine actuator, to control rail pressure or the engine as described herein.

If the pressure level in the gas accumulator 2 has a value between the first threshold pressure value of, for example, 320 bar and the fifth threshold pressure value of, for example, 220 bar, the gas is conveyed over the fourth gas line 17. In the case of low to medium power demands on the gas engine, the second target value of the rail pressure of, for example, 200 bar applies and in the case of high powers, the first target value of the rail pressure of, for example, 300 bar is valid. In other words, the rail pressure can vary in dependence on the required engine load. If the second rail pressure target value of, for example, 200 bar applies, that is, for example, a low power demand, the fuel gas supply preferably takes place over the fourth gas line 17 directly from the gas accumulator 2, with the gas received therein having a sufficiently high pressure to generate the required rail pressure. A pressure level of, for example, 230 bar that is in any case somewhat above the fifth threshold pressure value of, for example, 220 bar is provided in the gas buffer 3. If a high power demand is made starting from a low to medium load of the gas engine, a fuel gas supply of the gas engine from the gas buffer 3 takes place over the second gas line 7 by a corresponding switchover of the valves for the different gas lines 5, 7, 17 emanating from the gas accumulator. The latter makes possible a raising of the rail pressure to its first target value of, for example, 300 bar, that has to be present on a high power request in the rail, while using the compressor 10.

The big advantage here is that less energy is supplied to the compressor 10 overall because a smaller amount of fuel gas has to be raised via the compressor 10 during this operating mode and starting from a pressure level between the first and fifth threshold pressure values to a correspondingly high pressure level that enables an operation of the gas engine below the first target value of the rail pressure of, for example, 300 bar. If the instantaneous pressure in the pressure gas store 2 is within the range between the first threshold pressure value and the fifth threshold pressure value, the higher target value of the rail pressure is only requested when, due to a high power request to the gas engine with an increased value, an increased rail pressure can be used that has to be supplied with an energy use applied on board. In contrast, the second rail pressure target value of, for example, 200 bar applies during this further operating mode in lower and medium partial low operation of the gas engine because a compensation of the smaller rail pressure is possible here with respect to the gas engine by a simple adaptation of the fuel gas injection times and no or hardly any noticeable efficiency disadvantages therefore result. Any further ones of the aforesaid measures of a modified operating management of the gas engine that result in higher efficiency losses can be omitted in contrast.

Figure 1B:
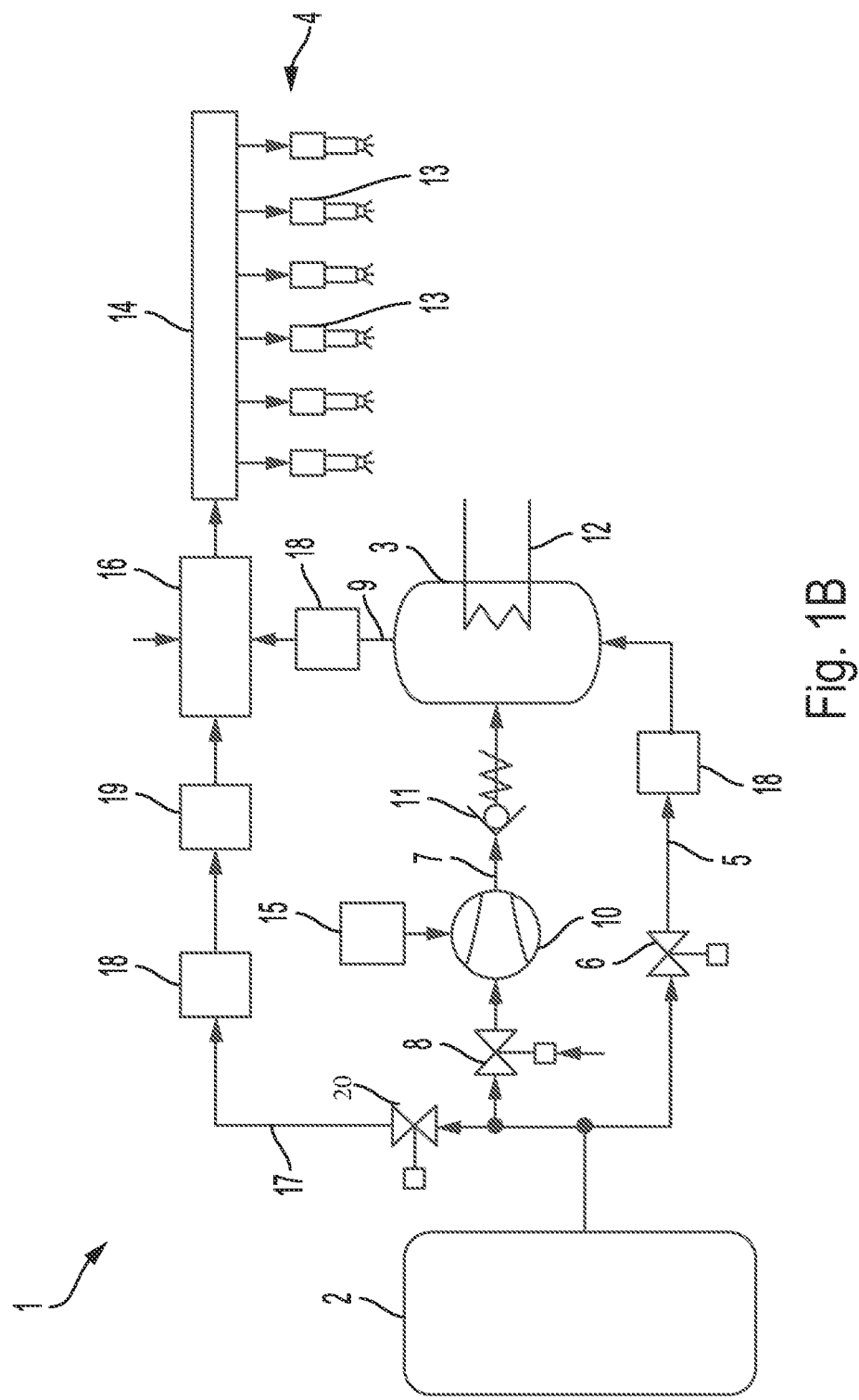
FIG. 1B: a further embodiment of the present invention.

The same principle can naturally be applied to different operating modes when the pressure level in the gas accumulator 2 has a value between the second threshold pressure value of, for example, 220 bar and a third threshold pressure value of, for example, 170 bar. In the fourth operating mode, a fuel gas supply of the gas engine can equally take place over the fourth line 17 shown in FIG. 1B, which is, however, only preferred for the lower load range. A fuel gas store is also provided at a pressure level of, for example, 330 bar in the gas buffer 3 in this operating mode to here also be able to switch over to a high load operation of the gas engine at short notice.

Provision can furthermore be made that a mobile work machine provided with the device in accordance with the invention has a recovery device. As is known, technical systems are equipped with energy stores so that an instantaneously available recovery power can be used at a later time.

Energy recovery is possible in certain application areas of the invention. On the use of a gas engine that is used together with a device in accordance with the invention in a mobile work machine, excess kinetic energy can e.g. arise. In the case of a mobile work machine configured as a crane, for instance, on the lowering of loads or on braking procedures during the travel movement. As is sufficiently known, rotation energy can be converted in such operating situations by electric machines operated as generators into electrical energy that can in turn be stored in a battery and/or in a double layer capacitor.

A further development of the invention provides that at least a proportion of this recovered or recoverable energy is used for the power supply of the compressor 10. In the event that the fuel gas pressure level in the gas accumulator 3 has already dropped below a threshold pressure value, the arising recovery power can be directly supplied to the compressor 10 so that it is supplied with fuel gas from the gas accumulator 2 to compress it accordingly so that it can be supplied to the gas buffer 3. In this manner, the process energy is provided, without using energy that has to be separately taken from the gas accumulator for this purpose, to produce a raising of the pressure level respectively an increase of the fuel gas store in the gas buffer that is then supplied to the gas engine in such operating situations when an efficiency advantage results, e.g. in high load operation, due to the high fuel gas injection pressure of, for example, 300 bar.

Alternatively or additionally, further energy stores that may be present can simultaneously be charged. In an exemplary embodiment, the compressor 10 could be driven by an electric machine 15 that is supplied via the onboard network battery. In this manner, the anyway present gas buffer 3 is supplied with recovery energy that could no longer be taken up at all by an onboard network battery that may be fully charged. It can optionally be sensible here to equip the gas engine with a more powerful generator and/or at least with one further alternator respectively an additional generator.

An onboard network battery having a higher capacity and/or an additional battery can optionally naturally be used for the storage of electrically recovered energy. In this respect, the gas buffer 3 that is anyway required can be used, depending on the manner of observation, as a direct user or as an energy store of recovery power.

Additionally or alternatively, a generator for taking up recovery power can also be installed such that it can take up recovery power outside the gas engine; in the example of a mobile work machine at the transfer case or in force transmission with a hydraulic machine via whose drive shaft recovery power occurs in certain operating situations.

Alternatively or additionally, at least one electrical energy store can be used that is based on double layer capacitors. Unlike battery cells, double layer capacitors have a much higher power density, but a smaller energy density. If there are predestined points of the occurrence of recovery power that is briefly very high at a mobile work machine and if a correspondingly powerful generator is provided for electrical recovery, the use of double layer capacitors can be particularly sensible. The double layer capacitors can store the high electrical powers that are subsequently provided to the comparatively low power electric motor driving the compressor 10. In general, double layer capacitors are more resistant to low temperature and more resistant to high temperatures and have a higher charge/discharge cycle strength than batteries.

Alternatively or additionally, a drive of the compresses via a hydraulic motor is possible. In a possible embodiment, this hydraulic motor is supplied by a hydraulic pump that can, for example, be located at a power takeoff of the gas engine or is installed at the transfer case. The hydraulic pump is preferably installed at a point in the drive system at which recovery power arises from time to time. Alternatively, instead of a separate hydraulic pump, a hydraulic motor required for the primary functions of the mobile work machine can be replaced with a hydraulic machine that works when recovery power arises in pump operation. When recovery power arises, it can be directly supplied to the hydraulic motor driving the compressor 10. A hydraulic accumulator for taking up recovery power that arises can be installed so that higher recovery powers can be taken up. A hydraulic accumulator can take up high powers comparable with a double layer capacitor, but has a low energy density. At a point at which high recovery powers are incurred briefly, they can thus be recovered and supplied to a hydraulic accumulator and is subsequently supplied to the hydraulic motor driving the compressor.

Alternatively or additionally, a plurality of hydraulic pumps, via which a hydraulic recovery is possible, can be used, with a plurality of hydraulic accumulators also being able to be installed for taking up recovery power.

In an application in which comparatively high portion amounts of recovery energy are incurred, it can be sensible to use a gas buffer having a higher capacity (e.g. 50 l).

A specific application example of an internal combustion energy will be presented in the following that has an engine power in the range from 360 kW to 450 kW and that can be provided for a mobile work machine, for example for a very large crawler crane having a payload of up to 300 metric tonnes. If this internal combustion engine were represented by a hydrogen engine, the would be a 6 cylinder engine having a capacity of two to three liters per cylinder from today's point of view, that has a hydrogen consumption of 27 kg/h at the operating point of its maximum output power.

Provision can thus be made that a hydrogen removal from the gas accumulator 2 takes place for so long until a residual pressure of 50 bar is present.

Provision can be made as a rule that a rail pressure of 300 bar is always provided to the hydrogen engine, i.e. during the whole time period over which the hydrogen pressure in the gas accumulator 2 falls from an initial approximately 700 bar to 50 bar in the course of the engine operation. In accordance with the invention, the compressor 10 supplies the gas buffer 3 with hydrogen amounts so that a maintenance of the rail pressure of 300 bar is possible. The maximum power of the compressor 10 results from the constellation that the compressor 10 has to provide a compression of hydrogen from 50 bar to, for example, 320 bar, at a flow rate of 27 kg/h. In practice, this constellation will only occur for a very brief time and requires the situation that the usable hydrogen accumulator in the gas accumulator tank 2 is just exhausted while the hydrogen engine is operated under full load. In this theoretical operating situation, the compressor should have a mechanical input power of at least 9 kW, preferably more than 12 kW, or better at least 14 kW.

The unit comprising the compressor 10 and its drive 16 is preferably configured such that a compression of fuel gas taken from the gas accumulator 2 can take place at this power with an efficiency that is as high as possible, said fuel gas being supplied to the gas buffer 3 so that a provision of fuel gas from this is possible while achieving a rail pressure of, for example, 300 bar.

The recharging of the gas buffer 3 thus preferably takes place portion-wise by a pulsed operation of the compressor 10. An automatic switching on and switching off of the compressor 10 particularly preferably takes place; for example in accordance with a simple two point characteristic. The switching on of the drive 16 takes place here above a specific pressure level in the gas buffer 3 at which the target rail pressure can still be provided and the switching off takes place at a specific pressure level disposed thereabove.

In accordance with the above third operating mode in which a rail pressure of 200 bar is available to the hydrogen engine, a demand of mechanical input power of the compressor amounts to at least 6 kW, better at least 8 kW, or even at least 10 kW.

Figure 2:
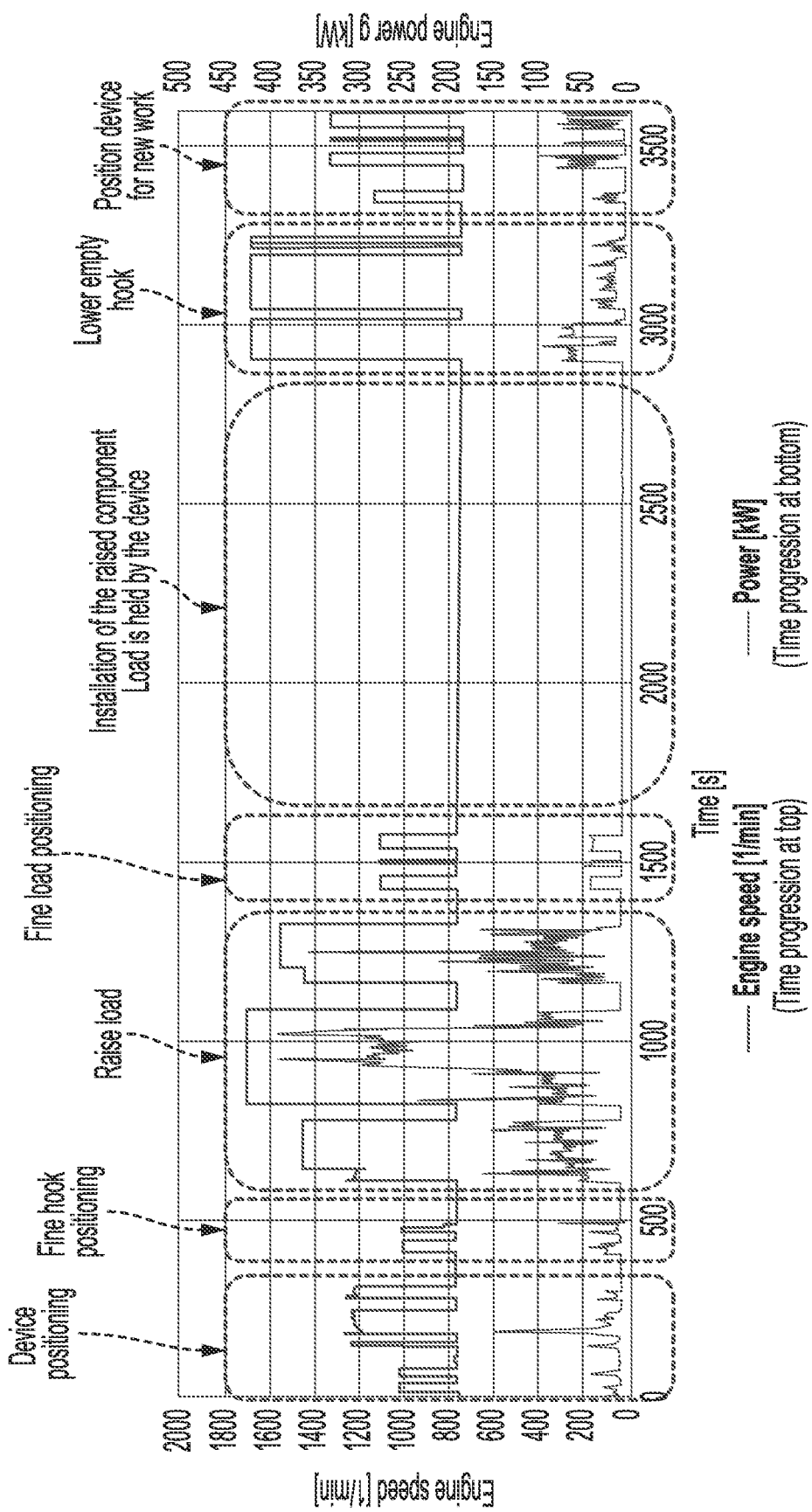
FIG. 2: an exemplary operating cycle of an internal combustion engine of a mobile work machine in accordance with the invention.

FIG. 2 shows a diagram of the engine speed and energy power over time. The graph arranged at the top in the diagram here represents the engine speed; the graph arranged below it shows the engine power. The two time progressions originate from a tachometer trace of a heavy crawler crane in real work deployment.

It can be recognized that in this real tachometer trace of a work deployment of the heavy crawler crane a plurality of work maneuvers is present (fine hook positioning, installation of the raised component, etc.) and thus long time periods are present during which the primary drive only works in the lower partial load operation, whereas the time periods in which the primary drive works in the upper partial load operation are comparatively short. The supply in accordance with the invention of the gaseous fuel is very efficient for such a use. Under the assumption that during the tachometer trace shown a fuel gas pressure is present in the gas accumulator between the first and second threshold values; the operating of the invention in the operating mode described in connection with FIG. 1A is above all very advantageous. In the dominating time periods, an operation of the gas engine is possible below the second rail pressure target value of, for example, 200 bar without having to perform such interventions in the operating management of the gas engine. However, thanks to the possibility of obtaining fuel gas from the gas buffer 3, the gas engine can very easily be operated during the covering of its load peaks while the first rail pressure target value is valid and is maintained, whereby such interventions in the operating management of the gas engine that permit an increased power output only in connection with a reduction in efficiency can also be omitted in high load phases. Thanks to the possibility of being able to remove fuel gas from the gas pressure tank 2 in parallel with the actual work deployment of the heavy crawler crane and of being able to supply the gas buffer 3 via the compressor 10 at a sufficiently high pressure, it is possible to be able to operate the gas engine during the validity and maintenance of the first rail pressure target value over longer time periods, which could possibly be necessary in the shown tachometer track within the time period in which the actual raising of the load evidently takes place (about the time 1000 s).

If the covering of the load peaks is to take place over an operation, of the gas engine below the first rail pressure target value while a fuel gas pressure is present in the gas accumulator 2 between the first threshold pressure value and the fifth threshold pressure value, the total compression energy to increase the pressure of the fuel gas has to be obtained at an increased fuel gas consumption. If the already presented possibility of recovery is included as a continuation of the invention in the considerations made here, it can be possible that a large part of the energy that is obtained from the compressor 10 to be able to provide said gas store in the gas buffer 3 can be taken from the recovery energy instead of a removal from the gas accumulator 2 separately required for this purpose.

As already discussed, an operation of the gas engine is alternatively possible while the second rail pressure target value of, for example, 200 bar is valid, but requires such interventions in the operating management of the gas engine that result in an increased fuel gas consumption to cover the load peaks.

Figure 3:
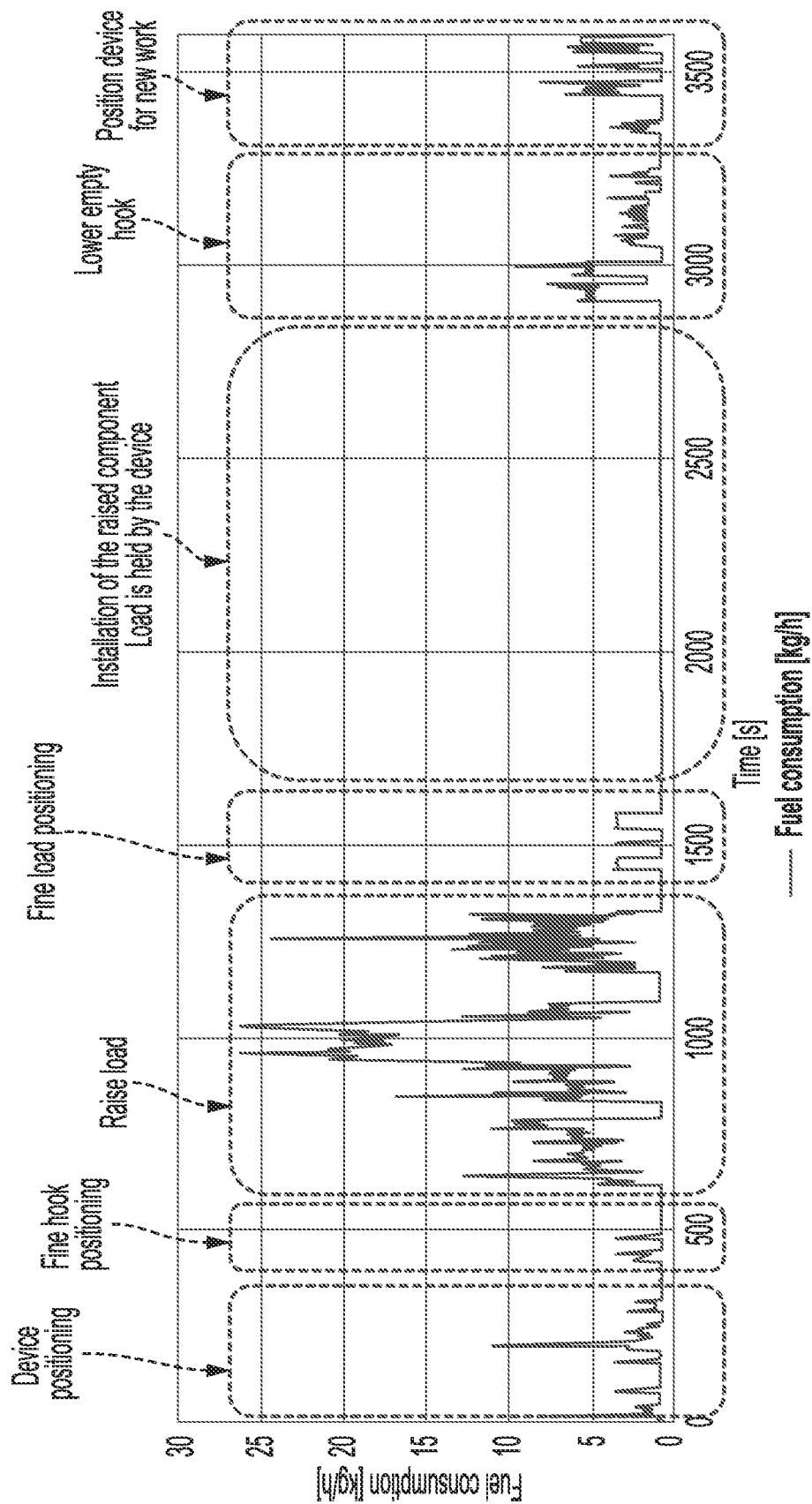
FIG. 3: a fuel gas consumption respectively a fuel consumption belonging to the operating cycle of FIG. 2.

FIG. 3 shows the fuel consumption belonging to FIG. 2 in kg/h. The tachometer trace shown in FIG. 2 comes from a heavy crawler crane operated by a diesel engine. The fuel consumption shown in FIG. 3 is based on simulation results that in turn relate to measurement and simulation results of a hydrogen engine in development. The hydrogen consumption substantially correlates with the available motor power.

REFERENCE NUMERAL LIST 1 device
2 gas accumulator
3 gas buffer
4 gas supply device
5 gas line
6 first valve
7 second gas line
8 second valve
9 third gas line
10 compressor
11 check valve
12 heat exchanger
13 gas supply injector
14 rail
15 compressor drive
16 gas pressure control device
17 fourth gas line
18 pressure limiter
19 compensation tank

The invention claimed is:

1. A device for supplying a gaseous fuel to an engine comprising:
   a gas accumulator for taking up highly pressurized gaseous fuel;
   a gas buffer for taking up medium pressurized gaseous fuel;
   a gas supply device for delivering the gaseous fuel into an engine combustion space;
   a first gas line that connects the gas accumulator to the gas buffer and whose gas flow can be regulated via a first valve;
   a second gas line that connects the gas accumulator to the gas buffer and whose gas flow can be regulated via a second valve, wherein the second valve is in the second gas line and the second gas line branches from a fourth gas line;
   a third gas line that connects the gas buffer to the gas supply device; and
   the fourth gas line extending from the gas accumulator to the gas supply device,
   wherein
      a compressor is arranged in the second gas line to increase a pressure of the gaseous fuel flowing from the gas accumulator to the gas buffer,
      the device further comprises a control unit that is configured to control the first valve such that the gaseous fuel flowing from the gas accumulator into the gas buffer has a medium pressure and, if the gaseous fuel remaining in the gas accumulator falls below the medium pressure, to close the first valve and to open the second valve to bring the gaseous fuel present below the medium pressure in the gas accumulator to the medium pressure with the compressor and to supply said gaseous fuel to the gas buffer, and
      the control unit is configured to open a further valve for the fourth gas line when a pressure level in the gas accumulator is below the medium pressure and fuel gas is supplied to the engine from the gas accumulator via the fourth gas line, and, when a pressure level in the gas accumulator is at or above the medium pressure, the control unit closes the further valve for the fourth gas line and opens the second valve to provide a fuel gas supply to the engine from the gas buffer via the second gas line.

2. The device in accordance with claim 1, wherein a check valve is arranged between a pressure side of the compressor and the gas buffer.

3. The device in accordance with claim 1, wherein the gas supply device is configured to introduce the gaseous fuel that has the medium pressure into the engine combustion space.

4. The device in accordance with claim 1, wherein the highly pressurized pressure corresponds to a pressure range of 550 to 850 bar, and the medium pressure corresponds to a pressure range of 150 to 500 bar.

5. The device in accordance with claim 1, wherein the gas accumulator has a larger storage volume that is at least 10 times larger than the gas buffer.

6. The device in accordance with claim 1, wherein the gas buffer and/or a gas line section between the gas buffer and the compressor is provided with a heat exchanger.

7. The device in accordance with claim 1, wherein the control unit is configured to extend an opening duration of the fuel gas supply to deliver the gaseous fuel into the engine combustion space and/or to shift ignition timing for a gas or gas mixture present in the engine combustion space when the gaseous fuel remaining in the gas accumulator falls below the medium pressure.

8. The device in accordance with claim 1, wherein the control unit is configured to change at least one operating parameter of the engine when the gaseous fuel remaining in the gas accumulator falls below the medium pressure, by:
  using a changed set of engine data that, for example, effects a power increase with the disadvantage of a reduced efficiency;
  lowering a charge air temperature by increasing a cooling power;
  making a mixture in the engine combustion space more lean by increasing a charge air amount with a simultaneous increase of a charge air cooling power;
  carrying out an external exhaust gas recirculation using an exhaust gas recirculation cooling;
  switching in of an internal exhaust gas recirculation; and/or
  carrying out a water injection.

9. The device in accordance with claim 1, further comprising the gaseous fuel supply to the engine taking place via a direct injection, with the engine being a hydrogen engine that is configured to combust hydrogen or a hydrogen mixture in the engine combustion space.

10. The device in accordance with claim 1, wherein the gas accumulator comprises a plurality of gas pressure storage units connected to one another.

11. The device in accordance with claim 1, wherein the gas supply device comprises a plurality of individual gas injectors that obtain the respective pressurized gas to be delivered into the engine combustion space through a common rail.

12. A mobile work machine, having the device in accordance with claim 1.

13. The mobile work machine in accordance with claim 12, further comprising a recovery device for converting kinetic energy into electrical energy, wherein the mobile work machine is configured to use the electrical energy to operate the compressor.

14. The mobile work machine in accordance with claim 12, further comprising a recovery device for converting kinetic energy into hydraulic energy, wherein the mobile work machine is configured to use the hydraulic energy to operate the compressor by supplying the hydraulic energy to a hydraulic motor driving the compressor.

15. The device in accordance with claim 5, wherein the gas accumulator has a storage volume of at least 25 times larger than the gas buffer.

16. The device in accordance with claim 6, wherein the heat exchanger is connected to a main cooling circuit of the engine.

17. The device in accordance with claim 11, wherein the common rail is arranged in the third gas line.

18. The mobile work machine in accordance with claim 13, wherein the electrical energy converted from kinetic energy is buffered in a battery before the supply to the compressor.

19. The mobile work machine in accordance with claim 14, wherein the hydraulic energy converted from kinetic energy is buffered in a hydraulic accumulator.

* * * * *